Patented Mar. 1, 1949

2,462,832

UNITED STATES PATENT OFFICE 2,462,832

ACTIVATOR FOR RUBBER ACCELERATOR

Cleon R. Johnson, Ridgewood, N. J.

No Drawing. Application July 10, 1945,
Serial No. 604,305

9 Claims. (Cl. 260—23.5)

This invention relates to the vulcanization of rubber, the invention being particularly concerned with a novel activator adapted to be employed in association with a vulcanization accelerator.

Although the improved activator of the present invention is of applicability to a variety of formulations of both natural and synthetic rubbers, the activator herein disclosed is of especial utility in the vulcanization of synthethic rubbers of the butadiene co-polymer type (for instance, butadiene-styrene and butadiene-acrylonitrile) in the presence of certain accelerators, especially those of the thiazole type and of the thiuram type. The butadiene-styrene type of synthetic rubber is now commonly referred to as GRS.

The activator of the present invention comprises the reaction product of tall oil with triethanolamine, the quantity of amine employed preferably being somewhat greater than that necessary to react with all of the acids present in the tall oil. As is known, tall oil is a waste or by-product of well known processes for obtaining wood pulp in the manufacture of paper, the tall oil consisting essentially of approximately one-half rosin acids and approximately one-half fatty acids, the latter having in general the characteristics of oleic acid.

I have found that the triethanolamine-tall oil reaction product is highly effective as an activator in rubber vulcanization and affords a number of advantages in comparison with other known activators. To bring out various of these advantages reference is first made to the known use of thiazole type of accelerator in the vulcanization of rubber, for instance, mercaptobenzothiazole or benzothiazyldisulfide. Such thiazole type accelerators have also commonly been employed in association with activators thereof, such for instance as diphenylguanidine. A typical known formulation incorporating both accelerator and activator, for example a formulation for the tread of an automobile tire, contains approximately 1.25 parts mercaptobenzothiazole and 0.25 part diphenylguanidine per 100 parts of rubber Other activators have also been employed in association with thiazole type accelerators, the general proportions as between activator and accelerator being of the order indicated in the example given just above.

According to the present invention, approximately equivalent properties in the vulcanizate, with respect to elongation, modulus, tensile strength, etc., can be secured by the employment of a much smaller quantity of the thiazole accelerator, in association with the amine-tall oil activator herein disclosed. Thus, in a typical formulation of the tire tread type, the quantity of the mercaptobenzothiazole may be reduced to about 0.6 part, the quantity of the amine-tall oil activator being in a typical example 1.6 parts. Economically, this alteration in formulation frequently results in substantial savings, since not only the thiazole accelerators but also various of the prior known activators are relatively expensive materials; whereas, in contrast, the improved activator of the present invention is made of relatively inexpensive materials. However, various of the advantages with respect to improved characteristics can be secured where the amount of the primary accelerator is not reduced, and in certain cases it may even be desirable to retain a relatively large quantity of the primary accelerator.

Beyond the foregoing, especial attention is directed to a difficulty which has heretofore been encountered with various synthetic rubbers and notably the butadiene-styrene co-polymer type with respect to aging qualities. Adaptation of the known general formulations and processing employed with natural rubber to the butadiene type of synthetic rubber has resulted in vulcanizates of very poor aging qualities particularly in the case of rubber articles such as tires which must of necessity be subjected to temperatures somewhat higher than atmospheric. It has been found that various activators employed such as diphenylguanidine actually function in a double capacity, serving not only to activate a thiazole type accelerator, but in addition, acting itself as an accelerator. Such combinations of thiazole type accelerators and activators when applied to the vulcanization of butadiene-styrene type rubber have yielded vulcanizates in which the thiazoles manifest a persistent effect, continuing to harden the vulcanized material with the passage of time, especially when the rubber article made therefrom is exposed to somewhat elevated temperatures.

I have found that this so-called "persistent effect" is at least in large part eliminated by the employment of the triethanolamine-tall oil activator.

Still another advantage of the present invention is that the employment of the novel amine-tall oil activator when employed in various formulations of synthetic rubber such as the butadiene type yields vulcanizates having other improved physical qualities, notably resistance to tear.

The quantity of the triethanolamine-tall oil activator which should be used will vary according to the type of formulation and the characteristics desired. Amounts from 0.1% to 4%, usually not over 3%, on the basis of the rubber present, give effective results. I have found that a ratio of about 1 part of thiazole accelerator to 2½ parts of the amine-tall oil activator is particularly useful in certain formulations, such as those for tire treads, although for some other purposes the quantity of accelerator may even be greater than the quantity of the amine-tall oil activator used, which represents a more customary relationship between accelerator and activator.

In the preparation of the activator of the present invention, either crude or more or less refined or purified tall oil may be utilized, the tall oil selected preferably being at least somewhat purified as compared with the original crude by-product form thereof. The tall oil and the triethanolamine are preferably warmed, for instance between about 60° C. and about 150° C. to promote the formation of the reaction product. Heating for a period of about one hour between about 90° C. and 110° C., with slow agitation or stirring, will serve the purpose.

The triethanolamine employed need not necessarily be a chemically pure product, but may satisfactorily be the common form of product obtainable commercially, which contains about 85% triethanolamine, the balance being chiefly other amines, such as monoethanolamine and diethanolamine.

The quantity of amine to the tall oil should be at least sufficient to react with and neutralize both the rosin and fatty acids present, and preferably, noticeably in excess of the stoichiometric quantity, especially when the activator is to be used with certain synthetic rubbers, such as the butadiene-styrene type. The proportion of amine by weight will vary depending upon the acid value of the particular tall oil being used.

An example of preparation of the activator is given just below:

To 1,000 grams of tall oil heated to 105° C. is added 620 grams of commercial triethanolamine, the heating being continued, with stirring, for approximately one hour.

EXAMPLES OF RUBBER FORMULATIONS AND VULCANIZATION

The following comparative formulations illustrate the effect of the activator of the present invention in combination with thiazole-type accelerators, in comparison with generally similar accelerator-activator formulations of prior or known types. In all of the examples below, the amine-tall oil activator employed was prepared in accordance with the example above.

In Table I—a just below, four (4) formulations (A, B, C and D) are given, formulation A representative of a typical known use of mercaptobenzothiazole with diphenylguanidine in tire tread stock. Formulations B, C and D are typical of those proposed in accordance with the present invention.

TABLE I—A

Formulation

| | A | B | C | D |
|---|---|---|---|---|
| GRS | 100 | 100 | 100 | 100 |
| Easy Processing Channel Black | 45 | 45 | 45 | 45 |
| Zinc Oxide | 5 | 5 | 5 | 5 |
| Stearic Acid | 1 | 1 | 1 | 1 |
| Pine Tar | 3.5 | 3.5 | 3.5 | 3.5 |
| Coal Tar Distillate Plasticizer | 4 | 4 | 4 | 4 |
| Mercaptobenzothiazole | 1.25 | 0.6 | 0.6 | 0.7 |
| Diphenylguanidine | 0.25 | | | |
| Triethanol-Amine-Tall Oil Activator | | 1.4 | 1.6 | 1.6 |
| Sulfur | 2 | 2 | 2 | 2 |

In Table I—b below, the values are given for tensile strength, modulus and elongation at five (5) different curing times at 280° F.

TABLE I—B

Tensile at break (lbs. per sq. in.)

| Cure 280° F. | A | B | C | D |
|---|---|---|---|---|
| 30' | 2,140 | 1,660 | 2,110 | 2,440 |
| 45' | 2,700 | 2,380 | 2,650 | 2,810 |
| 60' | 2,720 | 2,670 | 2,830 | 3,130 |
| 90' | 2,840 | 2,890 | 3,090 | 3,180 |
| 120' | 2,700 | 2,740 | 2,560 | 3,140 |

Modulus at 300% (lbs. per sq. in.)

| Cure 280° F. | A | B | C | D |
|---|---|---|---|---|
| 30' | 490 | 310 | 440 | 520 |
| 45' | 760 | 550 | 670 | 700 |
| 60' | 990 | 700 | 750 | 840 |
| 90' | 1,270 | 860 | 880 | 930 |
| 120' | 1,400 | 950 | 980 | 990 |

Per cent elongation at break

| Cure 280° F. | A | B | C | D |
|---|---|---|---|---|
| 30' | 760 | 880 | 820 | 800 |
| 45' | 650 | 760 | 730 | 720 |
| 60' | 590 | 700 | 690 | 680 |
| 90' | 520 | 650 | 680 | 640 |
| 120' | 480 | 610 | 580 | 620 |

The sixty-minute cure at 280° F. was subjected to aging by heating in an oven for twenty-four hours at 100° C. The improved characteristics, especially with respect to tensile strength and elongation secured by Formulations B, C and D, will at once be seen from Table I—c below.

TABLE I—C

After aging for 24 hrs. at 100° C.

| | A | B | C | D |
|---|---|---|---|---|
| Tensile at Break | 2,090 | 2,600 | 2,850 | 2,880 |
| Modulus at 300% | | 1,410 | 1,600 | 1,770 |
| Per Cent Elongation at Break | 290 | 480 | 480 | 450 |

It has heretofore been known to improve aging properties by decreasing the quantity of the primary accelerator and increasing the quantity of an activator such as diphenylguanidine. Even when compared with a formulation of this type, the formulation of the present invention manifests still greater improvement in aging, as is shown by the comparative formulations given in Tables II—a, II—b and II—c.

TABLE II—A
Formulation

|  | E | F |
|---|---|---|
| GRS | 100 | 100 |
| Sulfur | 2 | 2 |
| Mercaptobenzothiazole | 0.4 | 0.6 |
| Diphenylguanidine | 0.6 |  |
| Triethanol-Amine-Tall Oil Activator |  | 1.4 |
| Pine Tar | 3.5 | 3.5 |
| Coal Tar Distillate Plasticizer | 4 | 4 |
| Stearic Acid | 1 | 1 |
| Easy Processing Channel Black | 45 | 45 |
| Zinc Oxide | 5 | 5 |

TABLE II—B
Tensile at break (lbs. per sq. in.)

| Cure 280° F. | E | F |
|---|---|---|
| 30' | 1,750 | 1,540 |
| 45' | 2,560 | 2,490 |
| 60' | 3,060 | 2,770 |
| 90' | 3,100 | 3,180 |
| 120' | 3,120 | 3,270 |

Modulus at 300% (lbs. per sq. in.)

| Cure 280° F. | E | F |
|---|---|---|
| 30' | 300 | 280 |
| 45' | 530 | 530 |
| 60' | 700 | 650 |
| 90' | 900 | 820 |
| 120' | 990 | 930 |

Per cent elongation at break

| Cure 280° F. | E | F |
|---|---|---|
| 30' | 940 | 960 |
| 45' | 780 | 810 |
| 60' | 730 | 740 |
| 90' | 640 | 690 |
| 120' | 620 | 670 |

In Table II—c the figures after aging are given for the sixty-minute cure.

TABLE II—C
After aging for 24 hours at 100° C.

|  | E | F |
|---|---|---|
| Tensile at break | 2,600 | 3,150 |
| Modulus at 300% | 1,400 | 1,360 |
| Percent Elongation at Break | 460 | 560 |

In the comparative formulations given below in Tables III—a, III—b and III—c the effect of the activator of the present invention is shown in comparison with the known use of triethanolamine by itself in combination with a thiazole-type accelerator.

TABLE III—A
Formulation

|  | G | H |
|---|---|---|
| GRS | 100 | 100 |
| Mercaptobenzothiazole | 0.6 | 0.6 |
| Sulfur | 2 | 2 |
| Triethanol-Amine-Tall Oil Activator |  | 1.6 |
| Triethanolamine | 0.6 |  |
| Coal Tar Distillate Plasticizer | 4 | 4 |
| Pine Tar | 3.5 | 3.5 |
| Stearic Acid | 1 | 1 |
| Easy Processing Channel Black | 45 | 45 |
| Zinc Oxide | 5 | 5 |

Note that in the above table the quantity of triethanolamine used in formulation G is equal to the total quantity present in the amine-tall oil activator used in formulation H.

The figures in Tables III—b and III—c are given only for the optimum cure which occurred at forty-five minutes at 280° F.

TABLE III—B

|  | G | H |
|---|---|---|
| Tensile at Break | 2,080 | 2,180 |
| Modulus at 300% | 450 | 440 |
| Per Cent Elongation at Break | 790 | 810 |

TABLE III—C
After aging for 24 hrs. at 100° C.

|  | G | H |
|---|---|---|
| Tensile at Break | 2,090 | 2,520 |
| Modulus at 300% | 1,160 | 1,090 |
| Per Cent Elongation at Break | 480 | 580 |

From the above it will be seen that improvement shows up both in tensile strength and in elongation after aging.

The comparative formulations just below illustrate substitution of the amine-tall oil activator in place of diphenylguanidine in a type of formulation suitable for tire carcasses. The two comparative formulations are given in Table IV—a just below, and in Tables IV—b and IV—c the figures are given before and after aging (24 hours at 100° C.). The figures given are those for the optimum cure which occurred in twenty-five minutes at 280° F.

TABLE IV—A
Formulation

|  | J | K |
|---|---|---|
| GRS | 100 | 100 |
| Mercaptobenzothiazole | 0.75 | 0.75 |
| Sulfur | 3 | 3 |
| Diphenylguanidine | 0.12 |  |
| Trienthanol-Amine Tall Oil Activator |  | 0.6 |
| Viscous Asphalt | 10 | 10 |
| Semi-Reinforcing Furnace Black | 33 | 33 |
| Zinc Oxide | 5 | 5 |

TABLE IV—B

|  | J | K |
|---|---|---|
| Tensile at Break | 1,190 | 1,340 |
| Modulus at 300% | 300 | 270 |
| Percent Elongation at Break | 720 | 770 |

TABLE IV—C
After aging for 24 hrs. at 100° C.

|  | J | K |
|---|---|---|
| Tensile at Break | 770 | 850 |
| Modulus at 300% |  | 790 |
| Percent Elongation at Break | 290 | 310 |

In the formulations given below in Tables V—a, V—b and V—c, the effect of the activator of this invention is illustrated when used with an accelerator of the thiuram type, tetra-methyl thiuram-disulfide being employed for this illustration. The results are given in Tables V—b and V—c in the manner in which they appear in Tables II—b and II—c above.

TABLE V—A

|  | L | M |
|---|---|---|
| GRS | 100 |  |
| Sulfur | 1.6 | 2 |
| Tetra-methyl thiuram-disulfide | .5 | .25 |
| Triethanol-Amine Tall Oil Activator |  | .8 |
| Asphalt Flux | 10 | 10 |
| Stearic Acid | 1 | 1 |
| Easy Processing Channel Black | 20 | 20 |
| Semi-Reinforcing Furnace Black | 20 | 20 |
| Zinc Oxide | 4 | 4 |

TABLE V—B

Tensile at Break

| Cure 280° F. | L | M |
|---|---|---|
| 20' | 2,190 | 2,490 |
| 30' | 2,200 | 2,560 |
| 40' | 2,200 | 2,650 |
| 60' | 2,350 | 2,650 |
| 90' | 2,060 | 2,570 |

Modulus at 300%

| Cure 280° F. | L | M |
|---|---|---|
| 20' | 400 | 400 |
| 30' | 510 | 510 |
| 40' | 560 | 570 |
| 60' | 620 | 600 |
| 90' | 670 | 650 |

Elongation at Break

| Cure 280° F. | L | M |
|---|---|---|
| 20' | 900 | 880 |
| 30' | 755 | 790 |
| 40' | 730 | 790 |
| 60' | 700 | 755 |
| 90' | 645 | 760 |

TABLE V—C

Aged 48 hrs. at 100° C. 40'

| | | |
|---|---|---|
| Tensile | 2,010 | 2,280 |
| Modulus | 1,290 | 1,290 |
| Elongation | 440 | 540 |

It will be noted that in formulation M (employing the activator of this invention), the amount of the primary accelerator (tetra-methyl thiuram-disulfide) is substantially reduced as compared with that used in formulation L.

From Table V—b it will be noted that formulation M shows considerable improvement in tensile strength as compared with formulation L. Moreover, formulation M shows a marked improvement in elongation after aging—see Table V—c.

In still another group of comparative formulations, the effect of the improved activator of the present invention is demonstrated in use with natural rubber. The figures are given below in Tables VI—a, VI—b and VI—c, in the same general manner as above, it being noted that, as in the examples in Tables III—b and III—c, figures are given only for the optimum cure which occurred at sixty minutes at 287° F. The aging in this case was effected by treatment in an oxygen bomb for forty-eight hours at 70° C. and under 300 lbs. pressure.

TABLE VI—A

Formulation

|  | N | O | P | Q |
|---|---|---|---|---|
| Smoked Sheet | 100 | 100 | 100 | 100 |
| Mercaptobenzothiazole | 1 | 0.5 | 0.5 | 0.6 |
| Phenyl-beta naphthylamine (an antioxidant) | 1 | 1 | 1 | 1 |
| Triethanol-Amine Tall Oil Activator |  | 1.2 | 1.4 | 1.4 |
| Pine Tar | 4 | 4 | 4 | 4 |
| Stearic Acid | 3 | 3 | 3 | 3 |
| Easy Processing Channel Black | 50 | 50 | 50 | 50 |
| Zinc Oxide | 5 | 5 | 5 | 5 |
| Sulfur | 2.8 | 2.8 | 2.8 | 2.8 |

TABLE VI—B

|  | N | O | P | Q |
|---|---|---|---|---|
| Tensile at Break | 3,980 | 3,720 | 4,080 | 3,760 |
| Modulus at 300% | 1,580 | 1,300 | 1,260 | 1,320 |
| Per Cent Elongation at Break | 590 | 590 | 630 | 590 |

TABLE VI—C

After aging in bomb 48 hrs. at 70° C.—300 lbs.

|  | N | O | O | Q |
|---|---|---|---|---|
| Tensile at Break | 2,800 | 2,720 | 2,810 | 2,740 |
| Modulus at 300% | 1,810 | 1,870 | 1,700 | 1,820 |
| Per Cent Elongation at Break | 440 | 450 | 465 | 445 |

I claim:

1. In the vulcanization with sulfur of material selected from the group consisting of natural rubber and rubbery copolymers of butadiene-1,3 and styrene, the step of effecting vulcanization of the material in the presence of an accelerator selected from class consisting of thiazole accelerators and thiuram accelerators, and in the presence of the reaction product of tall oil and triethanolamine.

2. A process according to claim 1 in which the quantity of said reaction product present during vulcanization is greater than that of the accelerator.

3. A process according to claim 1 in which the quantity of said reaction product present during the vulcanization is between 0.1% and 4% of the said material by weight.

4. A process according to claim 1 in which the quantity of said reaction product present during vulcanization is between 1% and 3% of the said material by weight and in which the quantity of accelerator present is not more than one-half of the quantity of said reaction product.

5. In the vulcanization with sulfur of rubbery copolymers of butadiene-1,3 and styrene, the step of vulcanizing a rubbery copolymer of butadiene-1,3 and styrene in the presence of an accelerator selected from class consisting of thiazole accelerators and thiuram accelerators, and in the presence of the reaction product of tall oil and triethanolamine.

6. A process in accordance with claim 5 in which an excess of triethanolamine over the stoichiometric quantity necessary to neutralize the amount of tall oil is present.

7. In the process of vulcanizing with sulfur materials selected from the class consisting of natural rubber and rubbery copolymers of butadiene 1,3 and styrene in the presence of an accelerator selected from class consisting of thiazole accelerators and thiuram accelerators, the step of adding the reaction product of tall oil and triethanolamine, the quantity of said reaction product added being greater than the quantity of accelerator used.

8. A vulcanizate resulting from a process including the step recited in claim 1.

9. In the sulfur vulcanization of a material selected from the class consisting of natural rubber and rubbery copolymers of butadiene 1,3 and styrene in the presence of an accelerator selected from the class consisting of thiazole accelerators and thiuram accelerators, the step of activating the accelerator which comprises adding to the material to be vulcanized and effecting vulcanization in the presence of the reaction product of tall oil and triethanolamine.

CLEON R. JOHNSON.

REFERENCES CITED

The following references are of record in the file of this patent:

UNITED STATES PATENTS

| Number | Name | Date |
|---|---|---|
| 2,083,998 | Kratz et al. | June 15, 1937 |
| 2,188,420 | Semon | Jan. 30, 1940 |